July 22, 1924.
J. S. ABERCROMBIE
FISHING TOOL
Filed Jan. 28, 1921
1,502,416
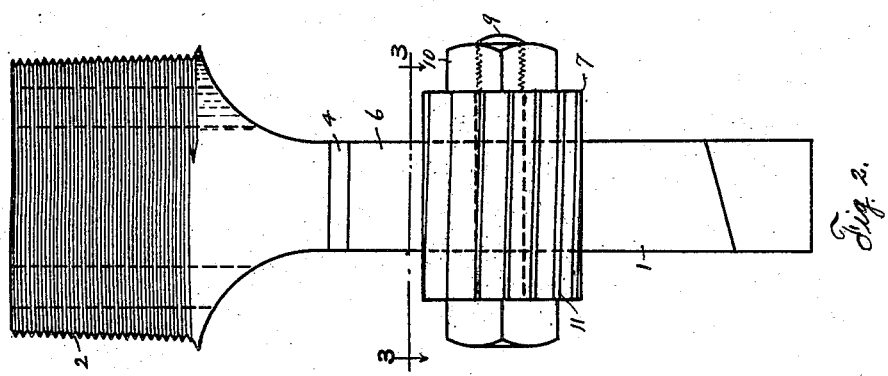
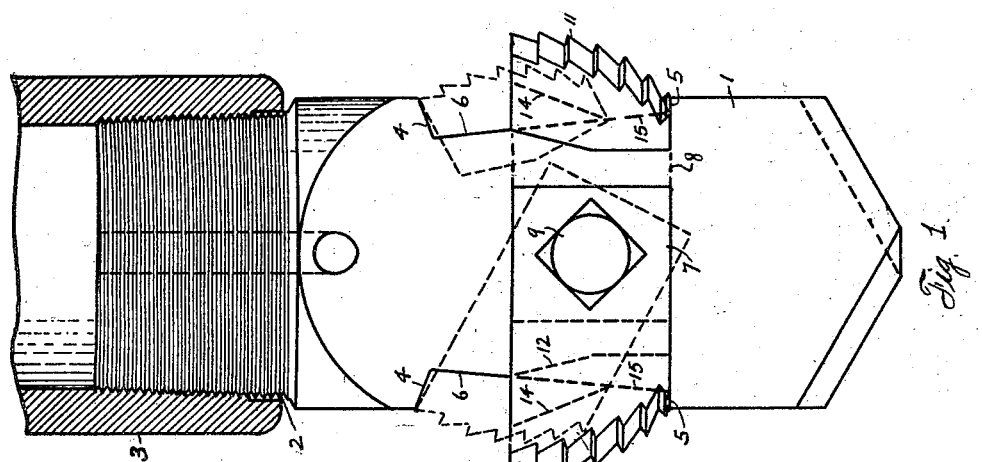
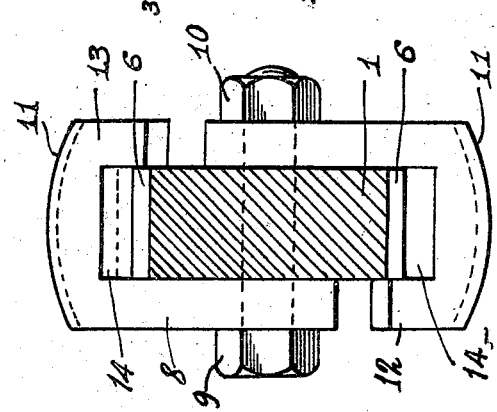
INVENTOR
James S. Abercrombie
BY
Hardway & Cathey
ATTORNEYS.

Patented July 22, 1924.

1,502,416

UNITED STATES PATENT OFFICE.

JAMES S. ABERCROMBIE, OF HOUSTON, TEXAS.

FISHING TOOL.

Application filed January 28, 1921. Serial No. 440,764.

*To all whom it may concern:*

Be it known that I, JAMES S. ABERCROMBIE, a citizen of the United States, residing at Houston, in the county of Harris and State of Texas, have invented certain new and useful Improvements in a Fishing Tool, of which the following is a specification.

This invention relates to new and useful improvements in a fishing tool.

One object of the invention is to provide a fishing tool which is specially for the purpose of engaging with and withdrawing pipe from well bores.

Another object of the invention is to provide a fishing tool equipped with pipe-engaging jaws of novel formation which are pivotally mounted so that the tool may be readily let down into the bore without the dogs engaging against the pipe, but upon upward pull of the tool, said dogs will engage with and withdraw said pipe from the bore.

A further feature of the invention resides in the provision of a fishing tool which is of simple construction and which consequently may be cheaply and easily manufactured.

With the above and other objects in view the invention has particular relation to certain novel features of construction, operation and arrangement of parts, an example of which is given in this specification and illustrated in the accompanying drawings, wherein:—

Figure 1 is a side elevation of the tool,

Figure 2 is an edge view, and Figure 3 shows a sectional view taken on the line 3—3 of Figure 2.

Referring now more particularly to the drawings wherein like numerals of reference designate similar parts in each of the figures, the numeral 1 refers to a blade-like bit whose upper end 2 is reduced and outwardly threaded to receive the lower end of a string of pipe through which the tool is let down into the pipe to be withdrawn. The lower end of the bit may be of any desired form but it is preferably pointed so that, if the pipe to be withdrawn is crushed or of irregular formation the tool may be forced downwardly therethrough to the desired point for engaging with it. On opposite sides the blade 1 is recessed, forming the upper sloping shoulders 4, and the lower abrupt shoulders 5 and presenting also the lateral faces 6, 6 which diverge slightly downwardly. Pipe-engaging dogs 7 and 8 are provided having flat bodies which fit against opposite sides of the blade, and are pivoted thereto by means of the bolt 9 which passes through said dogs and through the blade and which is secured in place by the usual nut 10. The outer ends of these dogs are arcuate in form and are serrated, forming the pipe-engaging teeth 11. It is to be observed that these dogs project out in opposite directions so as to engage against opposite sides of the pipe to be pulled. These dogs are formed with the overturned flanges 12 and 13 which fit around the respective edges of the blade, and each dog is formed with the diverging faces 14 and 15, which oppose the corresponding faces 6 of the blade 1. As the tool is being let down into the pipe the dogs will assume the position shown in dotted lines in Figure 1, the faces 14 fitting against the opposing faces 6, and said dogs will consequently not engage with the pipe or interfere with the descent of the tool. Upon upward pull, said dogs will engage against the walls of the pipe to be pulled and will be carried out in position indicated by the full line in Figure 1, the faces 15 thereof fitting closely against the opposing faces 6 of the blade 1, and said dogs resting upon the supporting shoulders 5. An upward pull on the pipe 3 will usually operate to withdraw the pipe, sought to be pulled, from the well bore, and it is to be noted that the load sustained by said dogs will be carried by the shoulders 5 and the opposing faces 6, said dogs being in effect wedged between them so that the bolt 9 will take only a small amount, if any, of the strain and will not be liable to be sheared off. This is a very important feature inasmuch as the tool is subjected to great strain in withdrawing the pipe, which if borne by the bolt would shear the same off.

If it is found that the pipe to be pulled cannot be withdrawn, the tool may then be rotated and gradually screwed out of the pipe. For this reason the teeth 11 are given a pitch, as shown in Figure 2, similar to the pitch of screw threads and the tool may thus be in effect unscrewed from the joint of pipe to which it is attached.

What I claim is:—

1. A fishing tool including a supporting member, pipe engaging dogs pivoted thereto and projecting in opposite directions beyond said member, said projecting ends having overturned flanges formed with grooves which receive the edges of said member.

2. A fishing tool including a supporting member whose opposite edges are formed with flat faces, pipe engaging dogs pivoted to said member and projecting in opposite directions beyond it, the projecting end of each dog being formed with diverging shoulders opposing the corresponding face, of said supporting member.

3. A fishing tool including a supporting member whose opposite edges are formed with flat faces, pipe engaging dogs pivoted to said member and projecting in opposite directions beyond it, the projecting end of each dog being formed with diverging shoulders opposing the corresponding face, said projecting ends being formed with spiraled teeth.

4. A fishing tool including a supporting member having its opposite edges formed into flat faces, pipe engaging dogs pivoted to said member and projecting beyond it in opposite directions, said projecting ends being serrated, diverging shoulders formed on each dog which oppose the corresponding face, said shoulders being extended, forming flanges which embrace said member.

5. A fishing tool including a flat supporting member whose opposite edges are recessed forming a sloping shoulder above each recess and an abrupt shoulder below the recess, pipe engaging dogs pivoted to said member and projecting beyond it in opposite directions, said projecting ends being serrated, diverging shoulders formed on each dog which oppose the said edges, the shoulders being extended forming flanges which embrace said member and said dogs when in active position being supported by said abrupt shoulders.

In testimony whereof I have signed my name to this specification in the presence of two subscribing witnesses.

JAMES S. ABERCROMBIE.

Witnesses:
 JNO. B. OLIVER,
 E. V. HARDWAY.